United States Patent [19]
Maerz

[11] Patent Number: 5,559,906
[45] Date of Patent: Sep. 24, 1996

[54] OPTICAL ARRANGEMENT OF A STRIP-SHAPED OPTICAL WAVEGUIDE

[75] Inventor: Reinhard Maerz, Munich, Germany

[73] Assignee: Siemens Aktiengesellschaft, Munich, Germany

[21] Appl. No.: 371,299

[22] Filed: Jan. 11, 1995

[30] Foreign Application Priority Data

Jan. 11, 1994 [DE] Germany .................. 44 00 554.7

[51] Int. Cl.$^6$ .................................................. G02F 1/035
[52] U.S. Cl. .................................... 385/3; 385/40
[58] Field of Search .................. 385/3, 2, 10, 24, 385/27, 28, 31, 32, 36, 37, 88, 89, 46, 40

[56] References Cited

U.S. PATENT DOCUMENTS

| | | | |
|---|---|---|---|
| 4,737,003 | 4/1988 | Matsumura et al. | 385/40 |
| 5,136,671 | 8/1992 | Dragone | 385/46 |
| 5,226,100 | 7/1993 | Maerz | 385/45 |
| 5,243,672 | 9/1993 | Dragone | 385/46 |
| 5,351,317 | 9/1994 | Weber | 385/3 |
| 5,414,548 | 5/1995 | Tachikawa et al. | 359/130 |

FOREIGN PATENT DOCUMENTS 0444817  9/1991  European Pat. Off. .

OTHER PUBLICATIONS

"Enhanced Electro-Optic Effect in Amorphous Hydrogenated Silicon leaded Waveguides" by Zelikson et al., Appl. Phys. Lett. 61(14), 5 Oct. 1992.
"Fibre-Optic Variable Delay Lines" by Bowers et al. Nov. 1982 Electronics letters, vol. 18 No. 23 pp.(999–1000).
Patent Abstract of Japanese 5-323246 of Dec. 7, 1993, *Patent Abstracts of Japan*, vol. 18, No. 146 (p. 1707) Mar. 10, 1994.
M. K. Smit, "New Focusing and Dispersive Planar Component Based on an Optical Phased Array", *Electronics Letters*, vol. 24, No. 7, 31 Mar. 1988, pp. 385–386.
Takahashi et al., "Arrayed-Waveguide Grating for Wavelength Division Multi-Demultiplexer with Nanometre Resolution", *Electronics Letters*, vol. 26, No. 2, 18 Jan. 1990, pp. 87–88.

*Primary Examiner*—Akm E. Ullah
*Attorney, Agent, or Firm*—Hill, Steadman & Simpson

[57] ABSTRACT

A tonable optical arrangement is composed of two or more strip waveguides disposed on a substrate with the waveguides having different lengths and at least one having a controllable phase shifting device for controlled generation of a phase shift in that particular waveguide. This arrangement is useful for WDM transmission, for wavelength switching or for wavelength conversion.

14 Claims, 7 Drawing Sheets

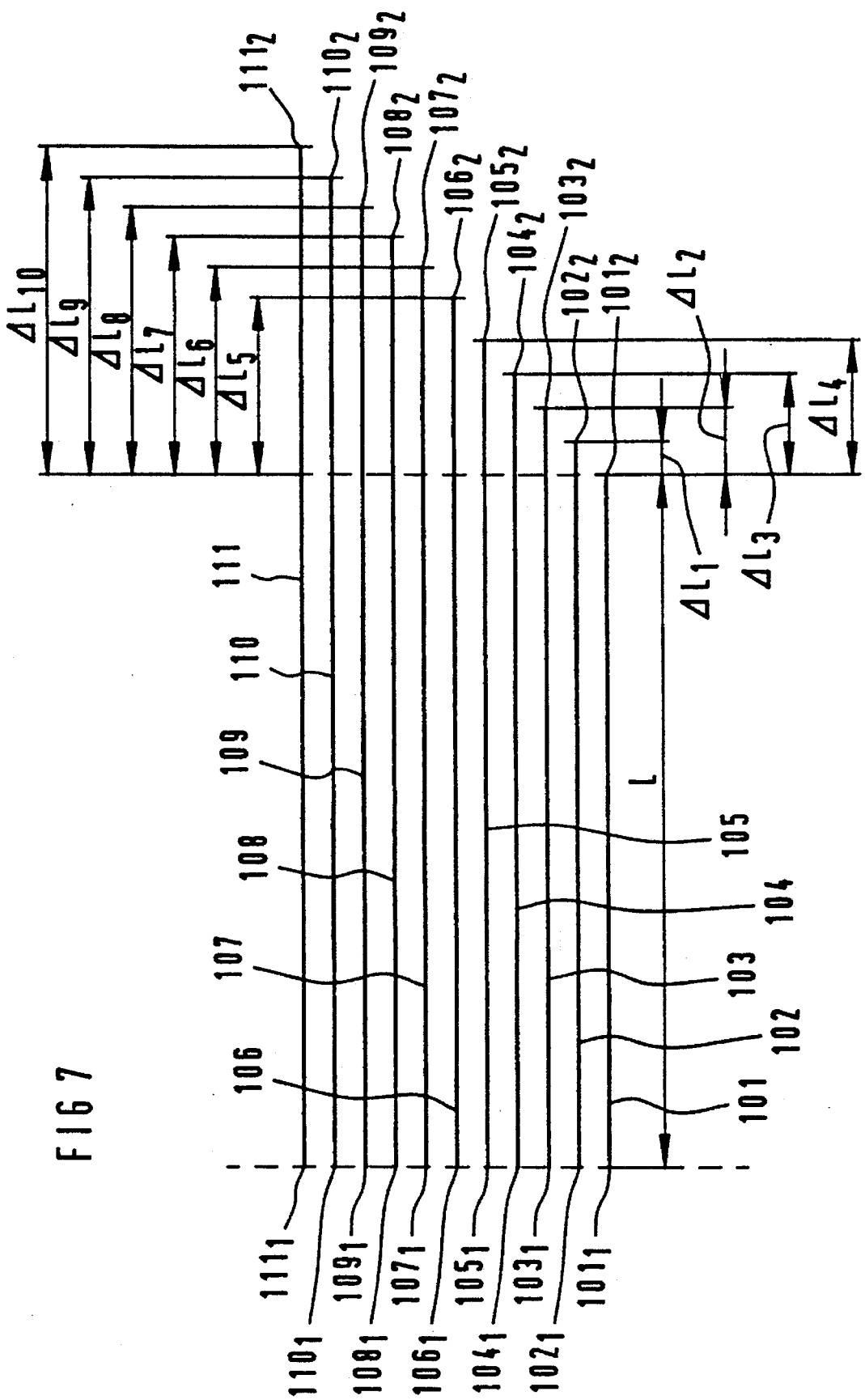

OPTICAL ARRANGEMENT OF A STRIP-SHAPED OPTICAL WAVEGUIDE

BACKGROUND OF THE INVENTION

The present invention is directed to an optical arrangement of a plurality of strip-shaped optical waveguides, with each of the waveguides extending between an optical input port of the arrangement to an optical output port of the arrangement allocated only for this particular waveguide and each waveguide comprising a specific path length between the input port and the allocated output port so that the path lengths of at least two waveguides differ, and wherein the output ports are arranged side-by-side at a slight spatial distance so that optical waves guided in the waveguides and outfed via the output ports are coherently superimposed on one another.

U.S. Pat. No. 5,226,100, whose disclosure is incorporated herein by reference thereto and which claims priority from German Application 40 29 971; the article by Smit entitled "New Focusing and Dispersive Planar Component Based on an Optical Phased Array", *Electronics Letters*, Vol. 24, No. 7, 31 Mar. 1988, pp. 385–386; and an article by Takahashi et al entitled "Arrayed-Waveguide Grating for Wavelength Division Multi/Demultiplexer with Nanometre Resolution", *Electronics Letters*, Vol. 26, No. 2, 18 Jan. 1990, pp. 87–88 each disclose an optical arrangement having two or more optical waveguides, with each optically connected to an optical input port of the arrangement and extending to an optical output port of the arrangement allocated only to the waveguide and having a specific path length between the input port and output port so that the length of at least two waveguides differ, wherein the output ports are arranged side-by-side at a slight spatial distance so that optical waves guided in the waveguides and outfed via the optical ports are coherently superimposed on one another and which form a phased array that can be employed as a transmitting optical phase grid.

SUMMARY OF THE INVENTION

The present invention is directed to providing a tunable optical arrangement of strip-shaped optical waveguides. To accomplish this goal, the present invention is directed to an improvement in an optical arrangement composed of two or more strip-shaped optical waveguides, each of which optically connects an optical input port of the arrangement to an optical output port of the arrangement allocated only on the waveguide and having a specific path length between the input port and the allocated output port so that the path lengths of at least two of the waveguides differ and wherein the output ports are arranged side-by-side at a slight spatial distance so that the optical waves guided in the waveguides and the outfeed via the output ports are coherently superimposed on one another. The improvement includes that at least one of the waveguides comprises a controllable phase shifting means for the controllable generation of a phase shift of an optical wave guided in this waveguide.

The phase shifting in each of the waveguides is accomplished by the waveguide having a material having a refractive index that can be varied by a specific physical quantity and the phase shifting device comprises means for generating controlled variation of this physical quantity. The quantity may be material which is an electro-optical material that will change a refractive index in response to a variation of electrical field being applied thereto, or it may be a material suitable for electrical charge carrier injection, and the means for applying the change includes a controlled variation in the charge carrier injection of this material.

In another embodiment, the material is a thermo-optical material and the phase shifting comprises means for generating a controlled variation of a temperature of the thermo-optical material.

The tunable integrated optical grid or filter is advantageously realized by the invention and is capable of separating a great number of wavelength channels as a discrete component and not as a filter cascade. Given a fixed wavelength, the arrangement of the invention can also be advantageously employed as a 1×N switch. The arrangement of the invention can be utilized for WDM transmission, wavelength switching and wavelength conversion.

Other advantages and features of the invention will be readily apparent from the following description of the preferred embodiments, the drawings and claims.

BRIEF DESCRIPTION OF THE DRAWINGS

FIG. 6b being a charge carrier injection phase shifting device; and FIG. 6c illustrating a thermo-optical phase shifting device; and FIG. 7 is a plan view of the optical waveguides of FIG. 1 arranged in long, straight parallel lines to one another to show fie difference in fie optical length of each of fie waveguides.

DESCRIPTION OF THE PREFERRED EMBODIMENTS

Figure 1:
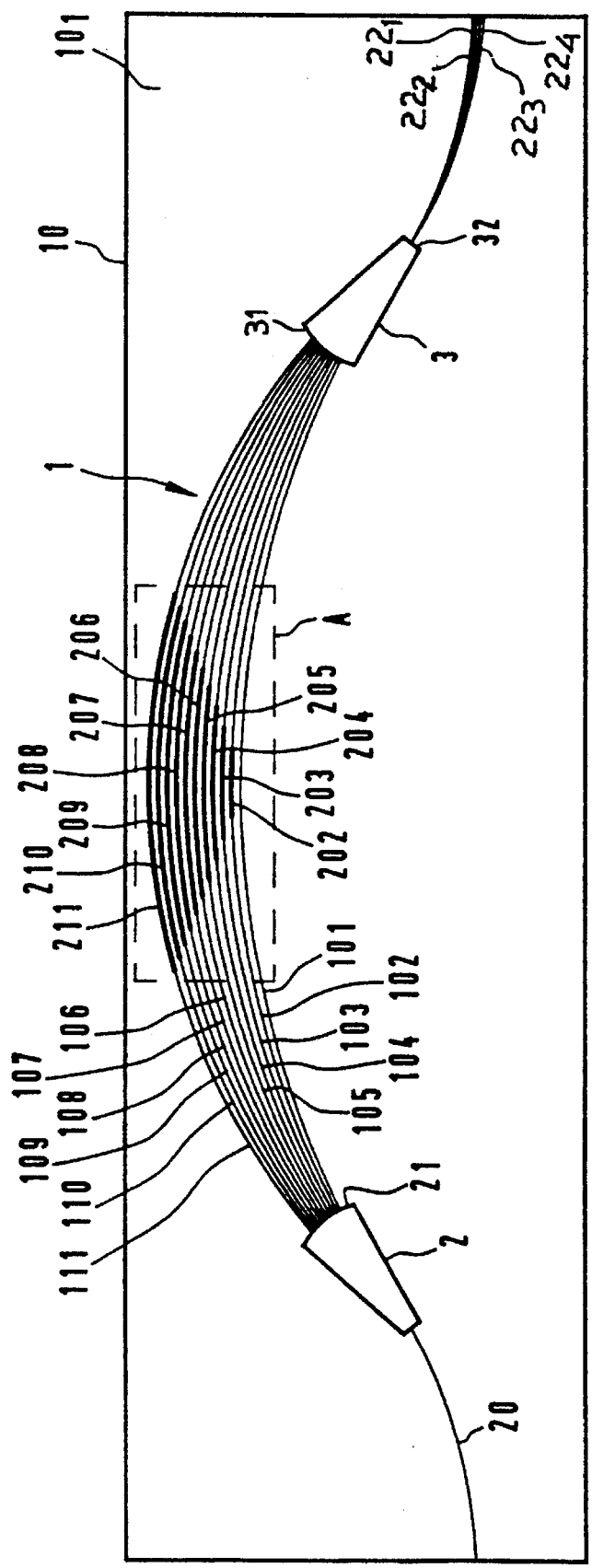
FIG. 1 is a plan view of an exemplary embodiment of the device of the present invention.

The principles of the present invention are particularly useful when incorporated in an arrangement or device, generally indicated at 1 in FIG. 1. As illustrated in FIG. 1, a substrate 10 has a planar surface $10_1$ on which the arrangement 1 is integratedly formed as a transmitting optical phase grid.

The arrangement 1 is composed of a plurality of strip-shaped optical waveguides 101, 102, . . . 111 forming a phased array with each waveguide being connected at an optical input port $101_1$, $102_1$, . . . $111_1$ (see FIGS. 2, 3 and 7) of the arrangement 1 and to optical output ports $101_2$, $102_2$, . . . $111_2$ of the arrangement which ports are allocated only to each of these waveguides. Each waveguide 101, 102, . . . 111 comprises a specific path length L, $L+\Delta L_1$, . . . $L+\Delta L_{10}$ between its input ports $101_1$, $102_1$, . . . $111_1$ and its output ports $101_2$, $102_2$, . . . $111_2$ so that, for example, the path lengths L through $L+\Delta L_{10}$ of all waveguides 101 through 111 differ from one another, as in traditional waveguide phase grids.

Figure 3:
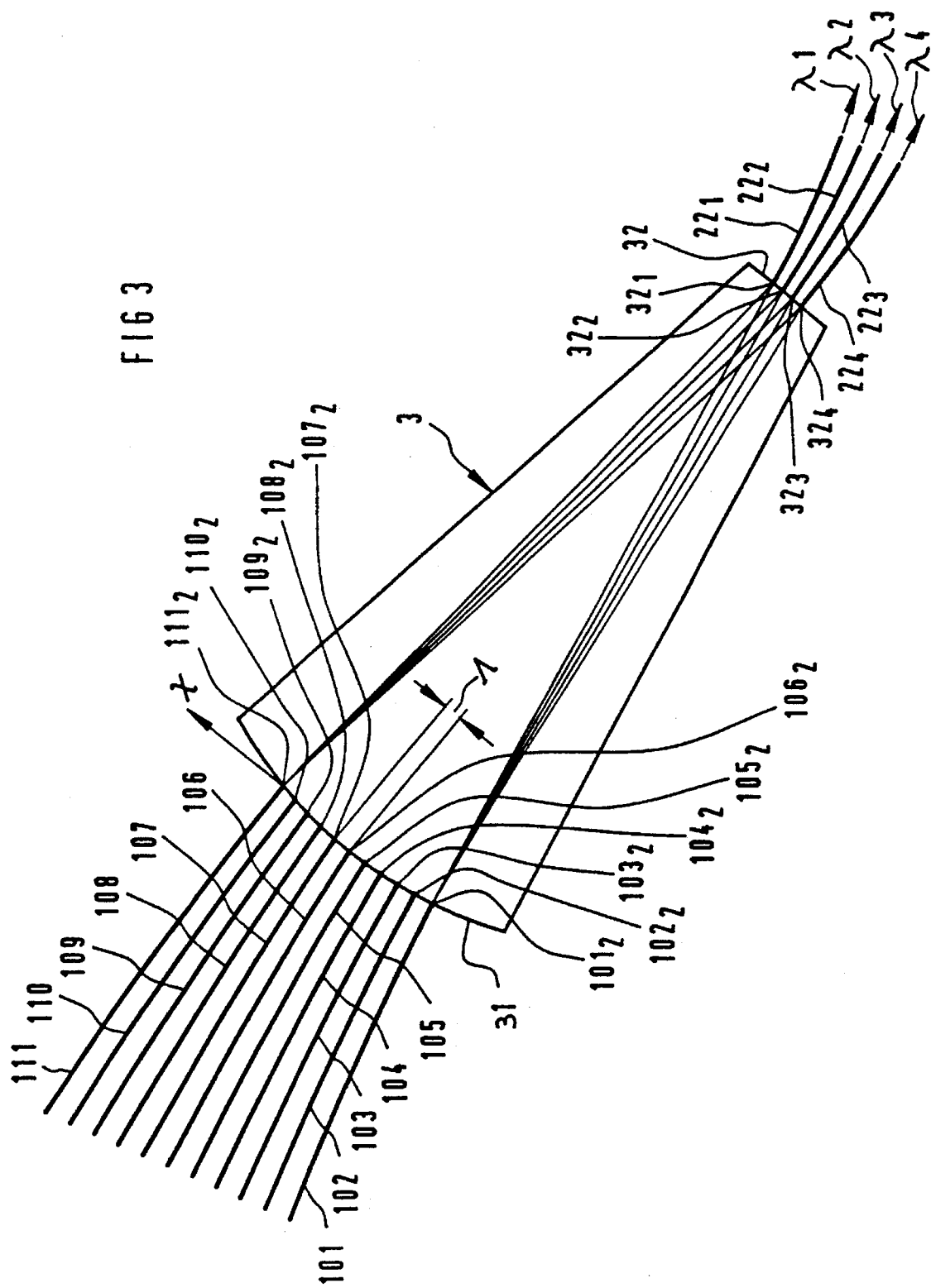
FIG. 3 is an enlarged plan view of an outfeed end for the device for coupling the optical waveguides out of the device.

The output ports $101_2$ through $111_2$ are arranged side-by-side at such a slight spatial distance $\Lambda$ (as illustrated in FIG. 3), to form a grid constant of the grid established by the arrangement 1, whose optical waves guided in the waveguides 101 through 111 and coupled out via the output ports $101_2$ through $111_2$ are coherently superimposed on one another.

in the arrangement 1 of FIG. 1, for example, 11 waveguides 101 through 111 are present. The plurality of waveguides is not limited to 11 waveguides, but can be a largely arbitrary whole number greater or smaller than 11.

The arrangement 1 produces a constant phase shift $\Delta\Phi$ between respectively two neighboring waveguides 101 through 111, because the length of the path for each waveguide increases by a constant amount $\Delta L$ from waveguide to waveguide. For example, the waveguides 101 through 111 subsequently comprise the path length L, L $+\Delta L_1 = L+\Delta L$, $L+\Delta L_2 = L+2\Delta L$, $L+\Delta L_3 = L+3\Delta L$, ... $L+\Delta L_{11} = L+11\Delta L$. In general terms, $L+\Delta L_a = L+a\Delta L$, as shown in FIG. 7, which is a standard arrangement.

For such an arrangement 1 in the form of a grid having a grid constant $\Lambda$ that is operated in the $m^{th}$ ($m=\pm 1$ $m\pm 2,\pm 3,$) diffractive order, the phase shift $\Delta\Phi$ is in a waveguide increases linearly with reference to the waveguide 101 having the shortest path length L with the spacing x of this waveguide from the waveguide 101 having this shortest wavelength L according to:

$$\Delta\Phi(x)=2\pi m\lambda/\lambda_o(x/\Lambda).$$

wherein $\lambda_o$ denotes the design wavelength at which the phase shift $\Delta\Phi$ between two neighboring waveguides amounts to exactly $2\pi m$.

Such a grid can be inventively tuned by providing an additional, preferably constant phase shift between two respective neighboring waveguides, The optical imaging properties are advantageously not influenced by this measure.

For producing an additional phase shift, at least one of the waveguides of the inventive arrangement or at least one of the waveguides 101 through 111 given the arrangement 1 of FIG. 1, inventively comprises a controllable phase shifter means for the controlled generation of a phase shift of an optical wave guided in the waveguide. Preferably, two or more neighboring waveguides of the waveguides 101 through 111 each comprise an independently controllable phase shifter device or means for the controlled generation of a phase shift of an optical wave being guided in the respective waveguides.

In the arrangement 1 of FIG. 1, for example, it has been established such that every waveguide 102, 103, . . . 111, except the waveguide 101, which has the comparatively shortest length or path L, comprises a respective phase shifter means 202, 203, . . . 211 (also see FIG. 4) for the controlled generation of phase shift $\Delta\Phi$ of an optical wave guided in each of these waveguides 102, 103, . . . 111.

The phase shifter devices or means of the various waveguides are preferably fashioned so that they generate a constant phase shift from waveguide to waveguide. In the simplest case, only structurally identical phase shifting devices having a respectively identical operating condition are employed for tuning, by generating identical modification in the $\Delta n$ of the effective refractive index n of the waveguides. The phase shifter $\Delta\Phi$ of such a grid in the $m^{th}$ diffractive order is:

$$\Delta\Phi(x)=2\pi(m+\Delta n/\Delta n_{2\pi})(\lambda/\lambda_o)(x/\Lambda),$$

wherein $\Delta n_{2\pi}$ is the change in refractive index that causes an additional phase shift by $2\pi$ between two neighboring waveguides. In order to effect this phase shift of $2\pi$, the phase shifter device must generate the refractive index $\Delta n_{2\pi}$ on a length $L_{2\pi}$ of the particular waveguide, and this is established by:

$$L_{2\pi}=\lambda_o/\Delta_{2\pi}.$$

The additional phase shift that can be achieved by tuning is preferably selected equal to $2\pi$.

In the arrangement 1 of FIG. 1, for example, it has been established that the additional phase shifts respectively generated by the phase shifter devices or means 202 through 211 continuously increase from the phase shifter device 202 of the waveguide 102 up to the phase shifter device 211 of the waveguide 111 so that the additional phase shift differs by $2\pi$ from waveguide to waveguide.

Before a specific structure of the phase shifting devices or means 202 through 211 of the arrangement 1 of FIG. 1 is discussed in greater detail, the arrangement 1 is described in general terms.

The optical wave to be coupled into the arrangement or device 1 in FIG. 1 is coupled into a waveguide 20 integrated on the surface $10_1$ of the substrate 10 and is supplied from this waveguide to a film waveguide 2, likewise integrated on the surface $10_1$ of the substrate 10. The film waveguide 2 spatially widens or expands this infed wave in the plane of the surface $10_1$ of the substrate 10 and distributes the expanded waves in terms of power parts onto the input ports $101_1$ through $111_1$ of the waveguides 101 through 111 of the arrangement or device 1 so that the respective part of the optical power contained in the widened waveguide is coupled via each input port $101_1$, $102_1$, ... $111_1$ into the respective waveguides 101,102, ... 111 of the arrangement or device 1, which waveguides have the input ports $101_1$, $102_1$, ... $111_1$, respectively.

Figure 2:
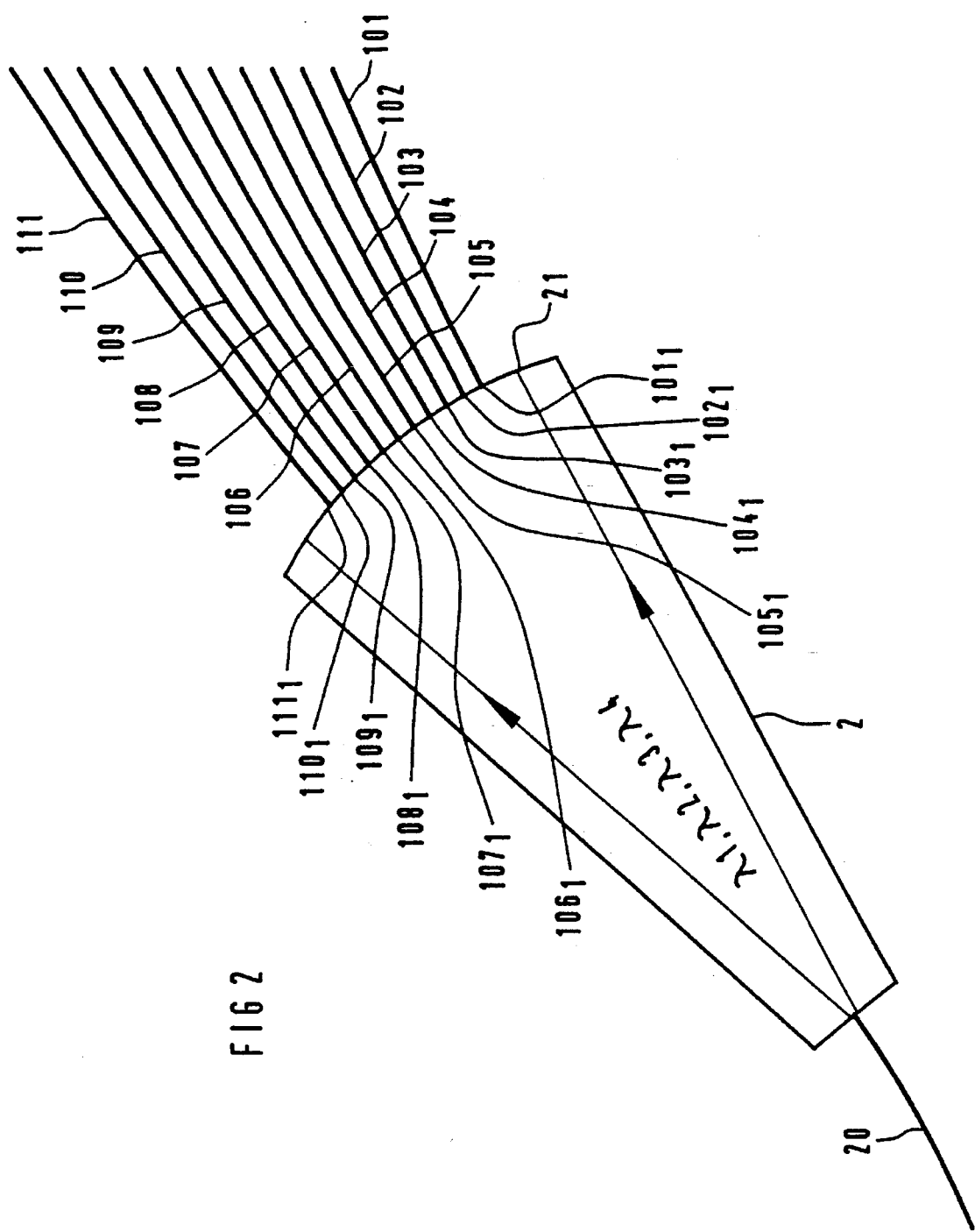
FIG. 2 is an enlarged plan view of the infeed end for the device of the present invention.

The film waveguide 2 of the input side is shown enlarged in FIG. 2. It may be derived from this Figure that the input ports $101_1$ through $111_1$ of the waveguides 101 through 111 lie in the plane of the surface $10_1$ of the substrate 10 are formed by ends of the waveguides 101 through 111 that adjoin a curved end face 21 of the film waveguide 2 of the input side via which the optical parts contained in the widened or expanded wave are distributed.

A film waveguide 3 (see FIG. 3) of the output side is integrated on the surface $10_1$ of the substrate 10 and has a curved surface or end face 31 which is coupled to the output ports $101_2$ through $111_2$ of the waveguides 101 through 111 of the grid. The film waveguide 3 also lies in the plane of the surface $10_1$ of the substrate 10, and this film waveguide 3 of the output side serves the purpose of guiding optical waves that are coupled out from the output ports $101_2$ through $111_2$ and are coherently superimposed on one another to an edge face 32 of the film waveguide 3 of the output side that faces away from the output ports $101_2$ through $111_2$ and end face 31. The output ports $101_2$ through $111_2$ are defined by the ends of the waveguides 101 through 111 adjoining the end face 31.

The edge face 32 of the film waveguide 3 of the output side facing away from the output ports $101_2$ through $111_2$ proceed through defined focal points $32_1$, $32_2$, $32_3$, $32_4$, which lie in the plane of the surface $10_1$ of the substrate 10 onto which specific optical wavelengths $\lambda_1$, $\lambda_2$, $\lambda_3$, $\lambda_4$ from the grid 1 that differ from one another are focused. Continuing optical waveguides $22_1$, $22_2$, $22_3$ and $22_4$ for carrying the optical wavelengths $\lambda_1$ through $\lambda_4$ focused onto these focal points $32_1$ through $32_4$ are coupled to the edge face 32 of the film waveguide 3 of the output side of these focal points $32_1$ through $32_4$. These waveguides $22_1$ through $22_4$ are also integrated on the surface $10_1$ of the substrate.

In this arrangement 1 of FIG. 1, four focal points that are allocated to four different wavelengths and four continuing waveguides are established. This is only an example. The plurality of different wavelengths and, thus, focal points can be selected respectively higher or lower than four, depending on the particular use of the device. This is also true for the number of continuing waveguides, such as $22_1$.

A phase shifting device 202, 203, . . . 211 are advantageously realized on each of the waveguides 102, 103, . . . 111 to which the phase shifting device 202, 203, . . . 211 are allocated. These phase shifting devices 202, 203, . . . 211 comprise a material having a refractive index $n_o$ variable on the basis of a specific physical quantity, and that this phase shifter device 202 through 211 comprises a means for generating a controlled variation of this physical quantity.

Figure 4:
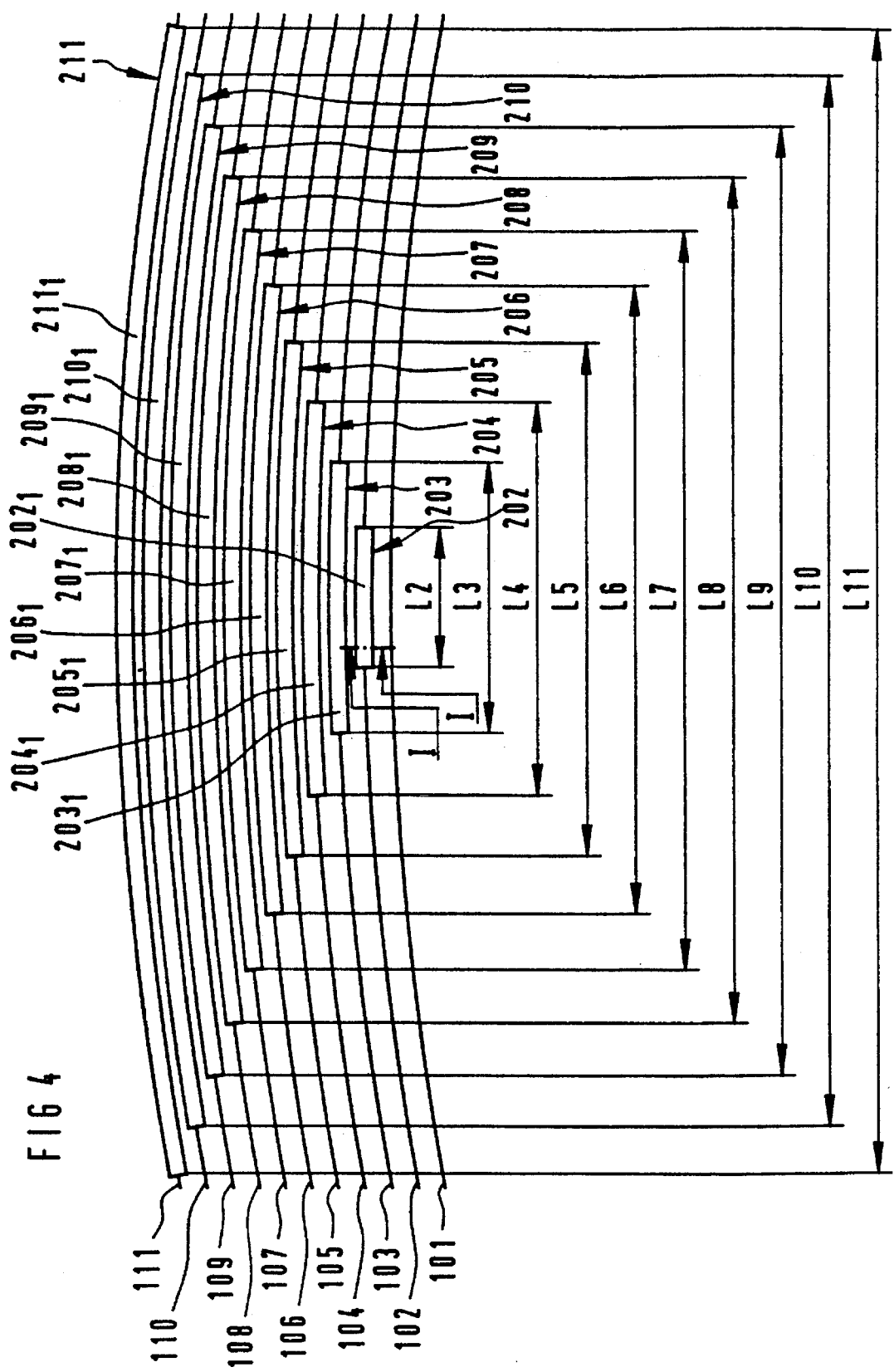
FIG. 4 is an enlarged plan view of the area bounded by the broken lines A of FIG. 1 illustrating the phase shifting arrangement of the present invention.

Given the exemplary embodiment of FIGS. 1 through 4, the physical quantity is generated, for example, along the longitudinal sections L2 through L11 of FIG. 4 of the particular waveguides 102, 103, . . . 111 wherein the effective refractive index n of the waveguides 102, 103, . . . 111 can be varied by their physical quantities along their length sections L2, . . . L11. A greater length of the longitudinal section given a constant change Δn in the refractive index per unit length denotes a greater phase shift over the longitudinal section.

The length of the longitudinal sections L2 through L11 increases continuously for the waveguides 102 through 111, respectively, given the assumption, for example, so that the longitudinal sections of respectively neighboring waveguides differ from one another by $L_{2\pi}=\lambda_o\Delta n_{2\pi}$, wherein $\Delta n_{2\pi}$ is the same for all waveguides 102 through 111. In this case, the longitudinal sections L2 through L11 are established by $L2=L_{2\pi}$, $L3=2L_{2\pi}$, . . . $L11=10L_{2\pi}$ or, in general terms, $La=aL_{2\pi}$, whereby the first waveguide 101 comprises no phase shifter device so that $L_1=0$ applies. The difference between the longitudinal sections of the neighboring waveguides respectively amounts to $L_{2\pi}$ in this case.

All effects that are utilized in refractive optical switches are fundamentally suitable for generating the additional phase shift in the waveguides of the inventive arrangement. In particular, these are as follows:

a) the electrical optical effect that, for example, occurs in LiNbO$_3$, plastics or III-V semiconductors, for example InGaAsP/InP or GaAlAs/GaAs, and whereby a change in refractive index is produced by an electrical field E;

b) charge carrier injections I into III-V semiconductors, for example InGaAsP/InP or GaAlAs/GaAs, wherein the change in refractive index is defined by the size of the injection I; and c) the thermo-optical effect that, for example, occurs in the material system of glass on silicon and given which the change in refractive index is determined by the temperature T.

Figure 6A:
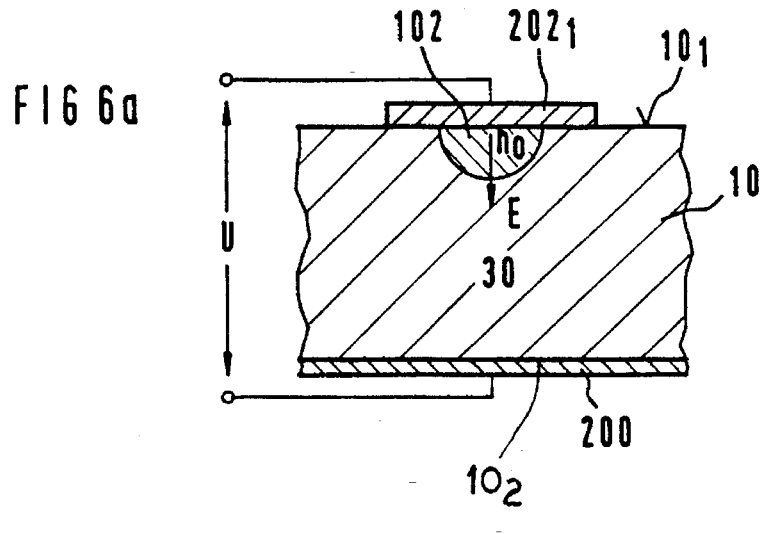
FIGS. 6a, 6b and 6c are three cross sectional views taken along the line I—I of FIGS. 4 and 5 illustrating three arrangements for causing the phase shifting, with FIG. 6a being an electro-optical phase shifting device.

Given the employment of the electro-optical effect, the physical quantity that varies the refractive index is an electrical filed E that acts on the electro-optical material 30 and varies a refractive index $n_o$ of this material 30 (see FIG. 6a). To that end, for example, every waveguide 102, 103, . . . or 111 comprises an electro-optical material 30 that, for example, is respectively arranged between two individually allocated electrodes $202_1$, 200; $203_1$, 200; . . . $211_1$, 200 between which the electrical voltage U that generates the electrical field E in the waveguides 102, 103, . . . 111 can be applied.

Standing for the other waveguides 103 through 111, FIG. 6a shows a corresponding exemplary arrangement for the waveguide 102 in cross section through the waveguide. The only electrode $202_1$ individually allocated to this waveguide 102 is arranged on the surface $10_1$ of the substrate 10 composed of electro-optical material 30, whereas the other electrode 200 allocated thereto can be allocated in common to all waveguides 102 through 111 and is arranged on a surface or side $10_2$ of the substrate 10 facing away from the surface $10_1$. The electrode 200 can also be arranged on the surface $10_1$ of the substrate, whereby a plurality of electrodes 200 individually allocated to each individual electrode $202_1$ can also be provided.

When the physical quantity producing a change in the refractive index is the size of a charge carrier injection I into a material 40 (see FIG. 6b) suitable for this injection, each waveguide 102, 103, . . . 111 comprises a material 40 suitable for the charge carrier injection I and, for example, is arranged between respectively two individually allocated electrodes $202_1$, 200; $203_1$, 200; . . . or $211_1$, 200 between which a current source with which the charge carrier injection I into the respective waveguide 102, 103, . . . or 111 can be generated and is connected.

Figure 6B:
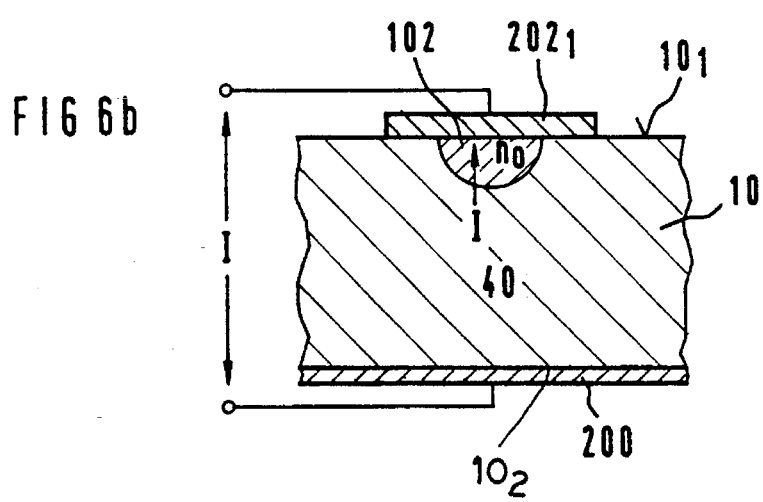

Standing for the other waveguides 103 through 111, FIG. 6b shows a corresponding arrangement for the waveguide 102 in cross section. The one electrode $202_1$ individually allocated to this waveguide 102 is arranged over the waveguide 102 on the surface $10_1$ of the substrate 10, which is composed of a III-V semiconductor material 40. The other electrode 200, which is allocated in common to all waveguides 102 through 111, is arranged on the side 102 of the substrate 10 facing away from the surface $10_1$.

Figure 6C:
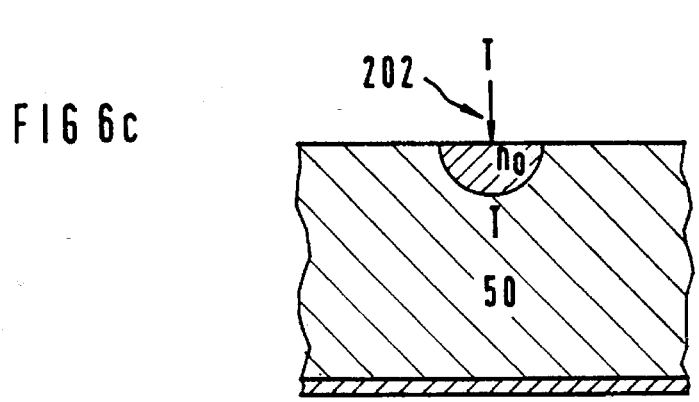

When the physical quantity that changes the refractive index is the temperature, each of the waveguides 102, 103, . . . or, respectively, 111 comprises a thermo-optical material 50 (see FIG. 6c), and each phase shifter device is composed of a device that varies the temperature T in the thermo-optical material 50 and, thus, varies the refractive index $n_o$ of this material.

In the examples illustrated in FIGS. 1 and 4, the two electrodes $202_1$, 200; $203_1$, 200; . . . $211_1$, 200 allocated to the individual waveguides 102, 103, . . . or, respectively, 111 are fashioned so that the physical quantity E, I or T that are generated in the particular waveguide 102, 103, . . . 111 acts continuously on the particular waveguide over th entire length of the longitudinal section $L_2$, $L_3$, . . . or $L_{11}$. Such a continuous influence along a waveguide for producing a desired change in refractive index is not required, but can also occur discontinuously so that the physical quantity acts in sections of this waveguide spatially separated from one another in order to produce this change in refractive index.

Figure 5:
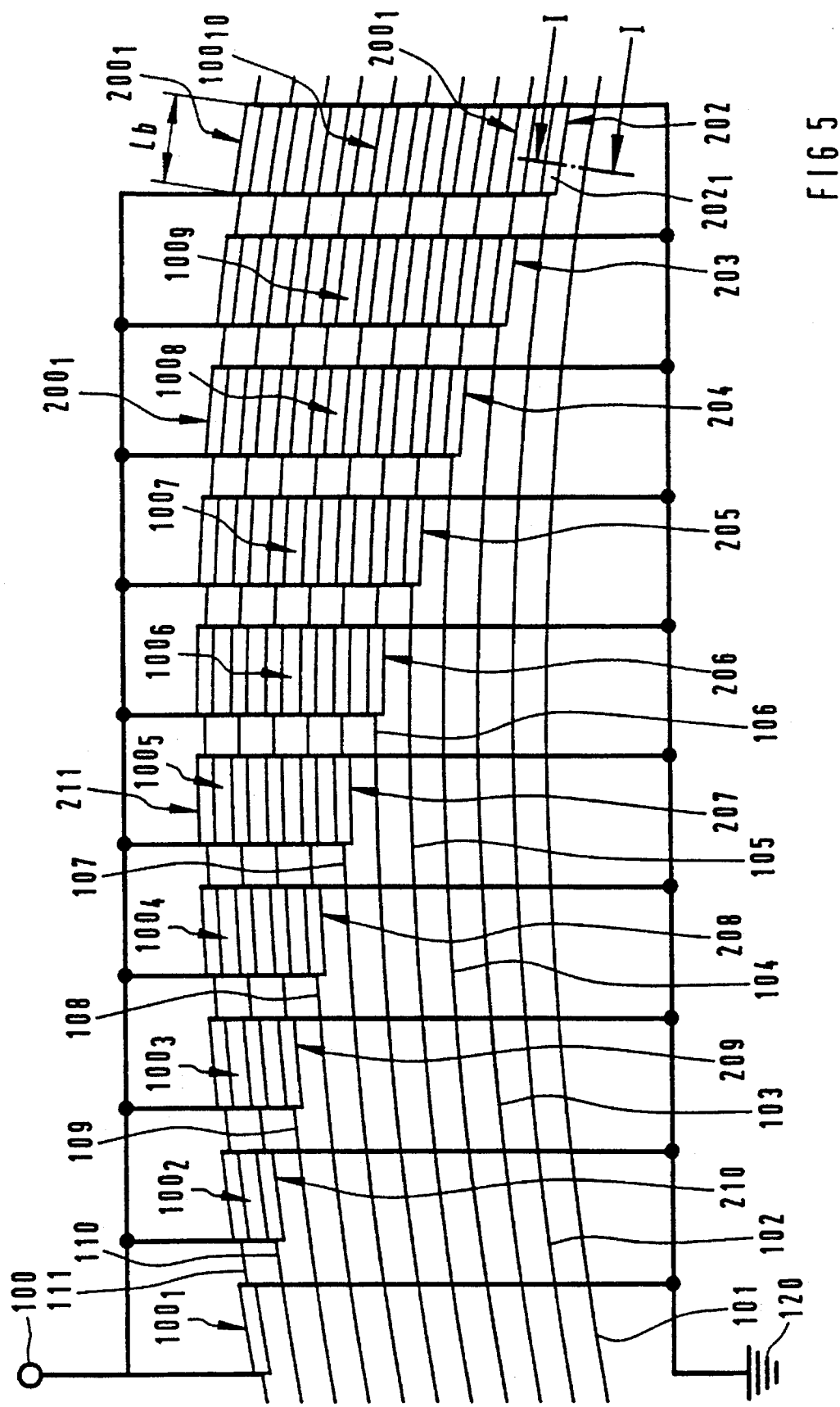
FIG. 5 is an embodiment of the phase shifting devices taken in a region similar to that of FIG. 4.

An embodiment of the device is illustrated in FIG. 5, and is an illustration of this discontinuous arrangement. According to the arrangement of FIG. 5, the phase shifter device 202, 203, . . . or, respectively, 211 of each waveguide 102, 103, . . . 111 is divided into one or more separate subsections $200_1$ of equal length $L_{2\pi}$ so that each waveguide 103, 104, . . . 111 includes a plurality of sub-sections $200_1$ of equal length $L_{2\pi}$ so that the plurality of sub-sections $200_1$ of two neighboring waveguides, such as 102 through 111, respectively differ from one another by a sub-section $200_1$ and a length $L_{2\pi}$ is equal to the length by which the phase shifter devices of neighboring waveguides respectively differ from one another in terms of their influencing length. The plurality of sub-sections $200_1$ continuously increases from 1 through 10 from waveguide 102 to waveguide 111 and corresponds to the length sections 202 through 211 of FIG. 4 in this sequence illustrated in FIG. 5.

Given the employment of the electro-optical effect or of charge carrier injection, each sub-section $200_1$ can comprise an electrode corresponding to the electrode $202_1$ of FIG. 6a or, respectively, FIG. 6b under which the electro-optical material or the III-V semiconductor material is arranged. In this case, the electrodes of the subsection $200_1$ of the various waveguides 102 through 111 can be advantageously connected in groups parallel between a control contact 100 and a ground 120 so that only the one control contact 100 is required for tuning.

According to FIG. 5, for example, ten groups of subsections $200_1$ are connected parallel between the control contact 100 and ground 120, and these ten groups comprise a plurality of sub-sections $200_1$ extending from one unit through ten and differ from one another. Advantageously, the electrodes allocated to the control contact 100 and the electrodes allocated to the ground 120 are arranged at the same side of the substrate given this arrangement.

In general, the tuning speed of the arrangement of the invention will be mainly influenced by the selection of the effect that varies the refractive index. It extends from milliseconds given the thermo-optical effect in glasses to nanoseconds or even shorter tuning times given utilization of the electro-optical effect or of charge carrier injection. Optical switches are currently available worldwide that allow one to anticipate a length $L_{2\pi}$ of 3 mm for thermo-optical switching in glass on silicon and of 400 µm in InGaAsP/InP for the smallest phase shifting device. Given acceptable chip areas, tunable grids having 16 channels with an arbitrary channel separation can thus be realized given a length of approximately 70 mm in glass on silicon or, respectively, 10 mm in InGaAsP/InP. Anticipated enhancements of the refractive switch effect due to the switch regions that are designed better benefit the tunable grid of the invention. Grids for 32 wavelength channels seem definitely realizable in the immediate future.

The arrangement of the invention can be tuned for the entire, free spectral range when the change $\Delta n_{2\pi}$ in the refractive index required therefor is achieved. The number of wavelength channels then approximately corresponds to the number of waveguides of the arrangement.

The arrangement of the invention can be employed as an optical filter and, given a fixed wavelength, can also be employed as a 1×N switch.

The arrangement of the invention can be advantageously varied as follows without a decisive modification of the functionality:

a) the phase shifter devices can be arranged shifted along the waveguides without the tuning behavior of the overall grid or filter being influenced;

b) in addition to the length of the phase shifter devices, the change $\Delta n$ in refractive index can also be varied from phase shifter device to phase shifter device, for example even such that the length of the phase shifter device is the same but $\Delta n$ differs from phase shifter device to phase shifter device;

c) the tuning of the grids or filters having a complicated phase response is likewise possible on the basis of suitably dimensioned phase shifter devices; and d) the electrical leads to the phase shifter devices can be optionally implemented individually or in common.

Although various minor modifications may be suggested by those versed in the art, it should be understood that I wish to embody within the scope of the patent granted hereon all such modifications as reasonably and properly come within the scope of my contribution to the art.

I claim:

1. In an optical arrangement composed of more than two strip-shaped optical waveguides, each waveguide optically connects an optical input port of the arrangement to an optical output port of the arrangement allocated only to this waveguide and comprises a specific path length between the input port and the allocated output port so that the path lengths of at least two waveguides differ and wherein the output ports are arranged side-by-side at such a slight spatial distance that the optical waves being guided in the waveguides and outfed via the output ports are coherently superimposed on one another, the improvements comprising at least two waveguides having a controllable phase shifting means for the controlled generation of a phase shift of an optical wave being guided in each of the waveguides, each controllable phase shifting means including the waveguide comprising a longitudinal section of material having a refractive index that can be varied by a specific physical quantity extending along the path length with the overall length of each section being different for each waveguide, each section having means for generating a controllable variation of the physical quantity in the section comprising the material extending between electrodes and means for applying electrical current to said electrodes to cause said material to vary the refractive index so that the amount of phase shifting in adjacent waveguides created by the controllable phase shifting means is different.

2. An optical arrangement according to claim 1, wherein the material is an electro-optical material and the means for applying applies an electrical field to the electro-optical material.

3. An optical arrangement according to claim 1, wherein the material is suitable for electrical charge carrier injection and said electrodes apply a charge carrier injection into said material.

4. An optical arrangement according to claim 1, which includes at least one phase shifter means comprising a thermal optical material and means for creating a temperature change in said thermal optical material.

5. In an optical arrangement according to claim 1, wherein the phase shifting means of different waveguides produces a phase shift that differs from waveguide to waveguide.

6. In an optical arrangement according to claim 5, wherein the waveguides have a path length that differs from waveguide to waveguide.

7. In an optical arrangement according to claim 1, wherein the longitudinal sections are formed of sub-sections of equal lengths and each waveguide with a phase shifting means has a different number of sub-sections.

8. In an optical arrangement according to claim 1, which includes a film waveguide on the input side for receiving the incoming optical wave to be coupled into the waveguide and spatially widening said infed wave and distributing the wave in terms of equal power parts to the input ports of the waveguides of the arrangement, wherein the equal parts are coupled into each of the optical waveguides of the arrangement.

9. In an optical arrangement according to claim 1, which includes a film waveguide on an output side of the arrangement, said film waveguide having the output ports of the waveguides and guiding the optical waves outfed from the output ports superimposed coherently on one another to an edge face of the film waveguide facing away from the output ports which edge face proceeds through focal points for the specific optical wavelengths of the arrangement differing from one another and focused by said film waveguide.

10. In an optical arrangement according to claim 9, which includes the continuing optical waveguides being arranged at the focal points for carrying the optical wavelengths focused onto the focal points, said continuing waveguides being coupled to the edge face of the film waveguide on the output side thereof.

11. In an optical arrangement according to claim 1, wherein the optical arrangement is a tunable optical wavelength filter.

12. In an optical arrangement according to claim 1, wherein the optical arrangement is an optical switch.

13. In an optical arrangement composed of at least three strip-shaped optical waveguides, each waveguide optically connects an optical input port of the arrangement to an optical output port of the arrangement allocated only to this waveguide and comprises a specific path length between the input port and the allocated output port so that the path length of each waveguide differs and wherein the output ports are arranged side-by-side at such a slight spatial distance that the optical waves being guided in the waveguides and outfed via the output ports are coherently superimposed on one another, the improvements comprising all but one of the waveguides having a controllable phase shifting means for the controlled generation of a phase shift of an optical wave being guided in the respective waveguides, each controllable phase shifting means including a waveguide comprising an electro-optical material having a refractive index that can be varied by a specific physical quantity extending along the longitudinal section of the path length with the overall length of each section being different for each of the waveguides having the phase shifting means, each section having means for generating a controllable variation of the physical quantity of said section comprising electrodes between which the electro-optical materials are arranged and means for applying an electrical voltage to the electrodes to create an electrical field on said electro-optical material.

14. In an optical arrangement according to claim 13, wherein each of the longitudinal sections is formed of sub-sections of equal lengths with the waveguides with a phase shifting means having different numbers of sub-sections.

* * * * *